Aug. 19, 1941.  H. R. YOUNG  2,253,413
SPINDLE DRIVE CONTROL FOR MACHINE TOOLS
Filed Nov. 14, 1939  2 Sheets-Sheet 2
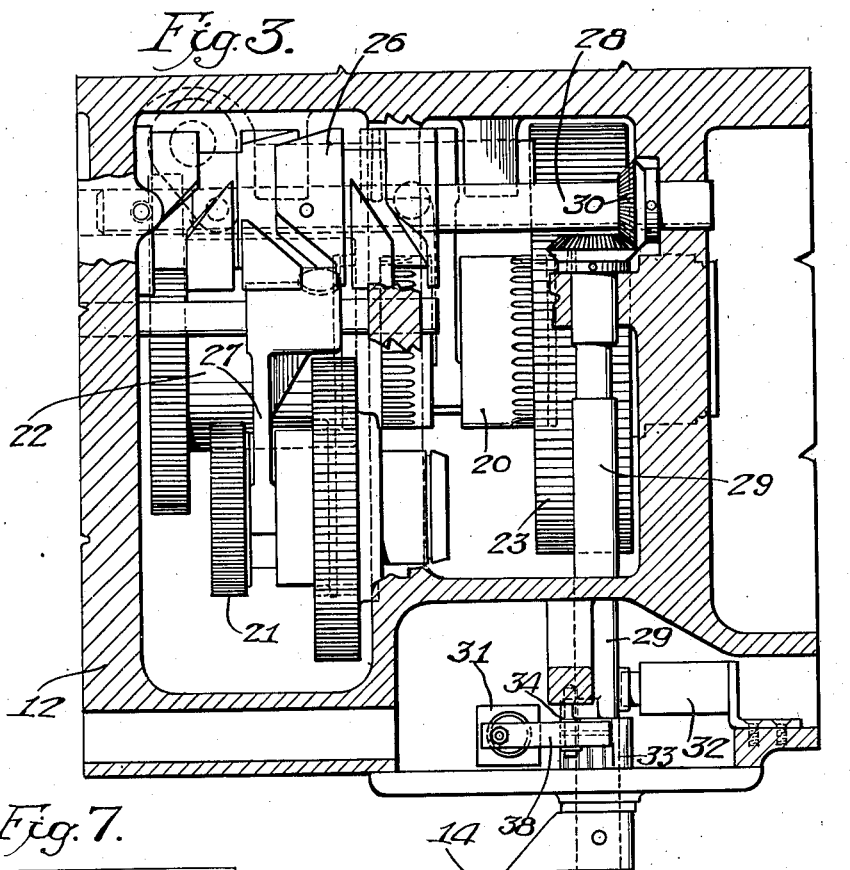
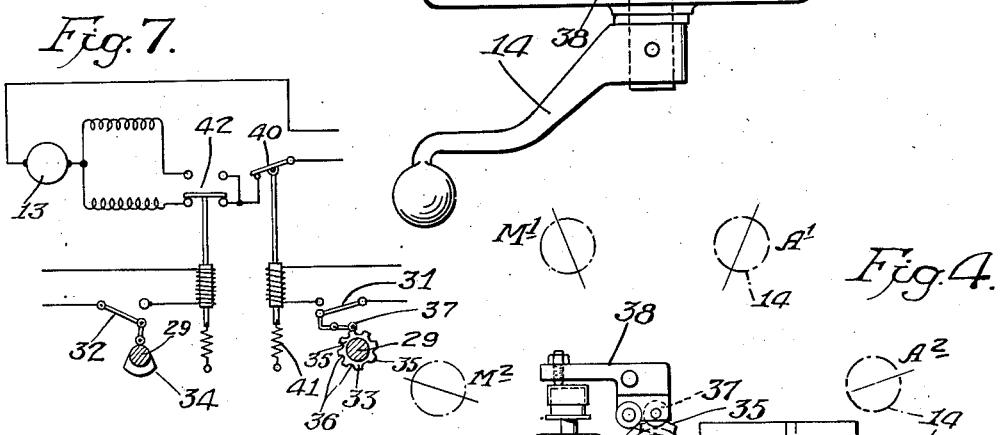
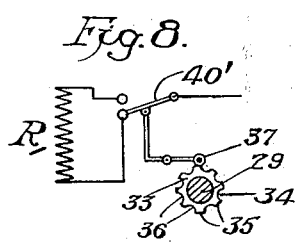
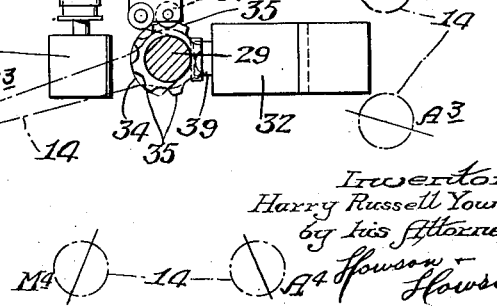
Inventor
Harry Russell Young
by his Attorneys
Howson & Howson Patented Aug. 19, 1941

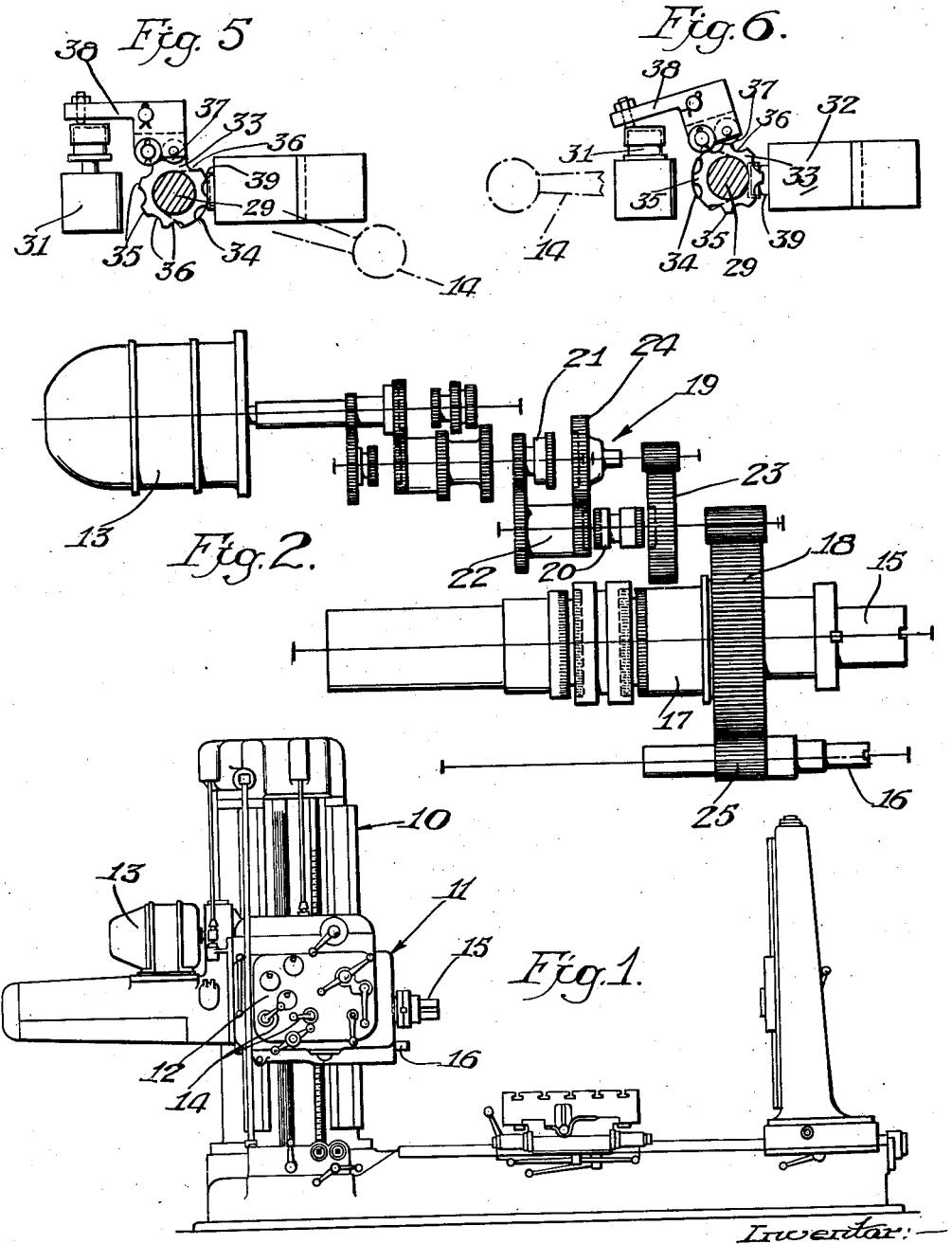

2,253,413

UNITED STATES PATENT OFFICE 2,253,413

SPINDLE DRIVE CONTROL FOR MACHINE TOOLS

Harry Russell Young, Merion, Pa., assignor to William Sellers & Company, Incorporated, Philadelphia, Pa., a corporation of Pennsylvania Application November 14, 1939, Serial No. 304,419

18 Claims. (Cl. 29—26)

This invention relates to a spindle drive control for machine tools and, more particularly, to a spindle drive control for machine tools of the multiple spindle type.

In many large machine tools, such as horizontal boring mills, it is common practice to employ two spindles, generally termed the main and auxiliary spindles, and to drive these spindles from a single source, and usually through a single transmission. The most convenient method of driving the auxiliary spindle is to provide a take-off drive from the main spindle to the auxiliary spindle, since this serves to eliminate some of the many controls necessary where a great many different speeds are essential.

Obviously, where a drive of this type is resorted to, in order to eliminate a multiplicity of gears and to conserve space, the most convenient method is to make the drive from the main to the auxiliary spindle direct, and in this case the auxiliary spindle will, obviously, have a reverse direction of rotation to that of the main spindle. For this reason, the usual practice is to incorporate in the transmission controlling the various speeds of the main and auxiliary spindles, a reverse gear which is utilized whenever a shift is made from the main to the auxiliary spindle, or vice versa. Such gearing is, obviously, space consuming and, in the absence of expensive and intricate interlocks, requires the use of a separate control lever.

An important object of the present invention is the provision in an apparatus of this character of an arrangement whereby the reverse gearing may be eliminated and the control of the reversal in change from main to auxiliary spindle, or vice versa, incorporated in the control mechanism which is utilized in shifting the gears of the transmission.

Another and more specific object of the invention is the provision in a transmission of the type described of a drive therefor incorporating a reversible motor together with means for reversing the motor when the transmission control is positioned to select a speed utilized on a spindle other than that which was previously in use.

Another object of the invention is to facilitate the operation of gear shifting by including means for slowing down the transmission during each shifting operation so that the gears may be more readily engaged.

Another and more specific object of the invention is the provision of means for insuring the necessity of completely engaging the gears of the transmission before starting any machining operation.

A still further object of the invention is the provision of means insuring slowing down of the transmission during any gear shifting operation without regard as to whether the machine has one or more spindles driven by the transmission.

These and other objects I attain by the construction shown in the accompanying drawings wherein, for the purpose of illustration, I have shown a preferred embodiment of my invention and wherein:

Fig. 1 is a side elevation of a machine tool of the type utilizing a drive in accordance with my invention;

Fig. 2 is a diagrammatic view showing the gearing controlling the operation of the main and auxiliary spindles;

Fig. 3 is a horizontal sectional view showing a portion of the transmission;

Fig. 4 is a semi-diagrammatic view showing the control switches and indicating in construction lines the various positions assumed by the control handle;

Figs. 5 and 6 are enlarged detail views of the switch control mechanism;

Fig. 7 is a wiring diagram showing one method of controlling the speed of the motor; and Fig. 8 is a fragmentary diagram showing a second method of controlling the motor speed.

Referring now more particularly to the drawings, the numeral 10 generally designates a horizontal boring mill having the usual vertically shiftable head 11 including a gear box 12, the gearing of which is driven from a motor 13 and the positions of the various gears of which are controlled through control handles 14. Through this gearing, main and auxiliary spindles 15 and 16 are rotated and/or fed longitudinally.

For the purpose of the present description, it is unnecessary that consideration be given to any other than a portion of the transmission control and the following description is, accordingly, limited to those portions of the transmission having to do particularly with my invention. As shown (Fig. 2) the main spindle 15 is equipped with a rotatable sleeve 17 bearing gear 18 which may be driven at variable speeds from motor 13 from a transmission 19 incorporating, among others, shiftable gear units 20 and 21, of which the gear unit 20, upon movement in one direction, coacts with one element of a gear unit 22, and in the opposite direction with a gear 23, and the gear unit 21, upon movement in one direction, coacts with a second element of gear unit 22 and in the opposite direction coacts with a gear 24. Sleeve 17 may be secured to spindle 15 to drive the same and auxiliary spindle 16 is driven directly from gear 18 and through a pinion 25.

As more clearly shown in Fig. 3, the positions of the shiftable gear units 20 and 21 are controlled by a rotatable cam 26 through the usual shifting forks one of which is indicated at 27. The cam 26 is mounted upon a shaft 28 which is driven from a shaft 29 through gearing 30, said shaft 29 being rotated by the control handle 14. The transmission casing 12 supports, in any suitable manner, a pair of switches 31 and 32, these switches being controlled by cams 33 and 34 respectively, said cams being carried by shaft 29. Cam 33 consists of a series of peaks 35 and grooves 36, the grooves in the present illustration corresponding in number to the desired positions M—1, M—2, M—3, M—4 and A—1, A—2, A—3 and A—4 of the control handle 14 and receiving a roller 37 on one arm of a pivoted switch operating lever 38, the other arm of which coacts directly with switch 31. When the roller 37 is engaged in a groove, switch 31 is open, and when this roller is elevated by a peak 35, switch 31 is closed. Cam 34, as illustrated, may be a plain cam and when engaged with the plunger 39 of switch 32 closes this switch, such closure occurring when the operating handle 14 assumes any of the positions A—1 to A—4 inclusive which correspond to positions of the units 20 and 21 producing auxiliary spindle drive speeds from the transmission 19. During the period when operating handle 14 is in any of the positions M—1 to M—4 which correspond to main spindle speeds, cam 34 is ineffective and switch 32 is open.

Motor 13 is of the reversible type and, as shown in the diagram of Fig. 7, may be controlled from the cams 33 and 34 as follows: Switch 31 controls a solenoid-operated switch 40 which, when in the opened position, closes the circuit of motor 13, the switch being normally held in its closed position through a suitable bias 41. In the diagram, switch 31 is shown in the open position, that is to say, the same position as that illustrated in Figs. 4 and 5, with the result that switch 40 is closed supplying current to the motor. When, however, one of the peaks 35 of cam 33 is engaged with the roller 37, switch 31 is closed shifting switch 40 to the open position with the result that the current supply to the motor ceases and motor 13 slows down, thus preparing the transmission for re-engagement of the gears, it being understood that these peaks correspond to neutral positions of gear units 20 or 21 such as that occupied by the gear unit 20 in Fig. 2.

With the handle in any of its M—1 to M—4 positions, switch 32 is open, as illustrated in the diagram, and this switch controls a reversing switch 42 which is normally biased to the position shown in Fig. 7 and only engages its back contacts when the circuit controlled by switch 32 is closed. A shift in the position of switch 42 resulting from opening or closing of switch 32 reverses motor 13, with the result that the effective drive through transmission 19 and gear 18 to spindle 16 will produce the same direction of rotation of the auxiliary spindle 16 as was previously provided for the main spindle 15, or vice versa. It will be understood that the diagram of Fig. 7 is purely illustrative, for the same effect may be produced in a variety of fashions. For example, instead of a switch opening the motor circuit, as shown at 40 in Fig. 7, I may employ a back-contacted switch 40' such as shown in Fig. 8, the switch 40' when engaged with its back contact introducing a resistance R in the motor circuit. It will be noted that by the use of the apparatus set forth the motor cannot resume its normal speed until the gearing in the process of shifting reaches its ultimate position, thus insuring against any possible operation of the machine with the gears or clutches affected in the change only partially engaged. It will also be noted that while the combination of switches employed is essential to operation of a double spindle machine of the type herein specifically referred to, the switch 31 alone is necessary where a single spindle machine is concerned. By use of this switch the slowing down of the transmission and the beneficial effects obtained by insurance against partial engagement of gearing or clutches may be obtained without use of the switch 32.

Since the construction illustrated is, obviously, capable of considerable modification without in any manner departing from the spirit of my invention, I do not wish to be understood as limiting myself thereto except as hereinafter claimed.

I claim:

1. In a machine tool of the type described and in combination, a reversible powershaft, a pair of spindles, a drive for said spindles so constructed and arranged that one spindle rotates reversely to the other, a transmission connecting said shaft and drive including shiftable units shifting of which produces a plurality of speeds comprising a group of speeds for and peculiar to each spindle, a single shiftable operating member controlling the shifting of said units and means automatically reversing said power shaft when the operating member is shifted to select a speed of a group other than that previously in use.

2. In a machine tool of the type described and in combination, a reversible power shaft, a pair of spindles, a drive for said spindles so constructed and arranged that one spindle rotates reversely to the other, a transmission connecting said shaft and drive including shiftable units shifting of which produces a plurality of speeds comprising a group of speeds for and peculiar to each spindle, a single shiftable operating member controlling the shifting of said units, means automatically reversing said power shaft when the operating member is shifted to select a speed of a group other than that previously in use, and means to reduce the speed of the power shaft during each selection of a speed.

3. In a machine tool of the type described and in combination, a reversible electrical motor, a pair of spindles, a drive for said spindles so constructed and arranged that one spindle rotates reversely to the other, a transmission connecting said motor and drive including shiftable units shifting of which produces a plurality of speeds comprising a group of speeds for and peculiar to each spindle, a single shiftable operating member controlling the shifting of said units and switching means automatically reversing said motor when the operating member is shifted to select a speed of a group other than that previously in use.

4. In a machine tool of the type described and in combination, a reversible electrical motor, a pair of spindles, a drive for said spindles so constructed and arranged that one spindle rotates reversely to the other, a transmission connecting said motor and drive including shiftable units shifting of which produces a plurality of speeds comprising a group of speeds for and peculiar to each spindle, a single shiftable operating member controlling the shifting of said units, switching means automatically reversing said motor when the operating member is shifted to select a speed of a group other than that previously in use, and means to reduce the speed of the motor during each selection of a speed.

5. In a machine tool of the type described and in combination, a reversible electrical motor, a pair of spindles, a drive for said spindles so constructed and arranged that one spindle rotates reversely to the other, a transmission connecting said motor and drive including shiftable units shifting of which produces a plurality of speeds comprising a group of speeds for and peculiar to each spindle, a single shiftable operating member controlling the shifting of said units, a circuit for said motor including a reversing switch, and a circuit controlled by the operating member and actuating the reversing switch to reverse said motor when the operating member is shifted to select a speed of a group other than that previously in use.

6. In a machine tool of the type described and in combination, a reversible electrical motor, a pair of spindles, a drive for said spindles so constructed and arranged that one spindle rotates reversely to the other, a transmission connecting said motor and drive including shiftable units shifting of which produces a plurality of speeds comprising a group of speeds for and peculiar to each spindle, a single shiftable operating member controlling the shifting of said units, a circuit for said motor including a reversing switch, a circuit controlled by the operating member and actuating the reversing switch to reverse said motor when the operating member is shifted to select a speed of a group other than that previously in use, and means to reduce the speed of the motor during each selection of a speed.

7. In a machine tool of the type described and in combination, a reversible electrical motor, a pair of spindles, a drive for said spindles so constructed and arranged that one spindle rotates reversely to the other, a transmission connecting said motor and drive including shiftable units shifting of which produces a plurality of speeds comprising a group of speeds for and peculiar to each spindle, a single shiftable operating member controlling the shifting of said units, a circuit for said motor including a reversing switch, a circuit controlled by the operating member and actuating the reversing switch to reverse said motor when the operating member is shifted to select a speed of a group other than that previously in use, and means to open the motor circuit and thereby reduce the speed of the motor during each speed selection.

8. In a machine tool of the type described and in combination, a reversible electrical motor, a pair of spindles, a drive for said spindles so constructed and arranged that one spindle rotates reversely to the other, a transmission connecting said motor and drive including shiftable units shifting of which produces a plurality of speeds comprising a group of speeds for and peculiar to each spindle, a single shiftable operating member controlling the shifting of said units, a circuit for said motor including a reversing switch, a circuit controlled by the operating member and actuating the reversing switch to reverse said motor when the operating member is shifted to select a speed of a group other than that previously in use, and means to introduce a resistance in the motor circuit during each speed selection.

9. In a machine tool of the type described and in combination, a motor, a spindle, a transmission connecting said motor and spindle including shiftable units shifting of which produces a plurality of speeds, a shiftable operating member controlling the shifting of said units and a circuit for said motor including a switch controlled by said operating member and reducing the speed of the motor during each shifting of one or more of said units by said operating member.

10. In a machine tool of the type described and in combination, a motor, a spindle, a transmission connecting said motor and spindle including shiftable units shifting of which produces a plurality of speeds, a rotatable member controlling the shifting of said units, a cam carried by the member and a circuit for the motor including a switch operated by the cam, said cam being so constructed and arranged that the switch is operated at each interval during which a shiftable unit is being shifted to thereby decrease the speed of the motor.

11. In a machine tool of the type described and in combination, a motor, a spindle, a transmission connecting said motor and spindle including shiftable units shifting of which produces a plurality of speeds, each of said units being movable between limits where they are fully engaged with coacting elements of the transmission and means to reduce the speed of the motor during shifting of any of said units.

12. In a machine tool of the type described and in combination, a motor, a spindle, a transmission connecting said motor and spindle including shiftable units shifting of which produces a plurality of speeds, a shiftable operating member controlling the shifting of said units and a circuit for said motor including a switch controlled by said operating member and opening the circuit of the motor to thereby reduce the speed of the motor during each shifting of one or more of said units by said operating member.

13. In a machine tool of the type described and in combination, a motor, a spindle, a transmission connecting said motor and spindle including shiftable units shifting of which produces a plurality of speeds, a shiftable operating member controlling the shifting of said units and a circuit for said motor including a switch controlled by said operating member and introducing resistance into the circuit of the motor to thereby reduce the speed of the motor during each shifting of one or more of said units by said operating member.

14. In a machine tool of the type described and in combination, a motor, a spindle, a transmission connecting said motor and spindle including shiftable units shifting of which produces a plurality of speeds, a rotatable member controlling the shifting of said units, said rotatable member being constructed and arranged to occupy a plurality of positions in each of which the shiftable units of the transmission are disposed to provide selected speeds of the spindle, a cam carried by said rotatable member and having peaks corresponding in number to the positions assumed by the member, and a motor circuit switch operated by said cam and reducing the speed of the motor during movement of said rotatable member between each of its selective positions.

15. In a machine tool of the type described and in combination, a motor, a spindle, a transmission connecting said motor and spindle including shiftable units shifting of which produces a plurality of speeds, a rotatable member controlling the shifting of said units, a cam carried by the member and a circuit for the motor including a switch operated by the cam, said cam being so constructed and arranged that the switch is operated to open the circuit of the motor at each interval during which a shiftable unit is being shifted to thereby decrease the speed of the motor.

16. In a machine tool of the type described and in combination, a motor, a spindle, a transmission connecting said motor and spindle including shiftable units shifting of which produces a plurality of speeds, a rotatable member controlling the shifting of said units, a cam carried by the member and a circuit for the motor including a switch operated by the cam, said cam being so constructed and arranged that the switch is operated to insert resistance in the circuit of the motor at each interval during which a shiftable unit is being shifted to thereby decrease the speed of the motor.

17. In a machine tool of the type described and in combination, a motor, a spindle, a transmission connecting said motor and spindle including shiftable units shifting of which produces a plurality of speeds, a rotatable member controlling the shifting of said units, a cam carried by the member and a circuit for the motor including a switch operated by the cam, said cam being so constructed and arranged that the switch is operated to open the circuit of the motor at each interval during which a shiftable unit is being shifted to thereby decrease the speed of the motor and to maintain said circuit open until the shifting of the shiftable unit is complete.

18. In a machine tool of the type described and in combination, a motor, a spindle, a transmission connecting said motor and spindle including shiftable units shifting of which produces a plurality of speeds, a rotatable member controlling the shifting of said units, a cam carried by the member and a circuit for the motor including a switch operated by the cam, said cam being so constructed and arranged that the switch is operated to insert resistance in the circuit of the motor at each interval during which a shiftable unit is being shifted to thereby decrease the speed of the motor and to maintain said resistance in said circuit until the shifting of the shiftable unit is completed.

HARRY RUSSELL YOUNG.